(12) United States Patent
Müller et al.

(10) Patent No.: US 10,994,679 B2
(45) Date of Patent: May 4, 2021

(54) ONBOARD ELECTRICAL SYSTEM FOR A MOTOR VEHICLE AND METHOD FOR OPERATING AN ONBOARD ELECTRICAL SYSTEM FOR A MOTOR VEHICLE

(71) Applicant: AUDI AG, Ingolstadt (DE)

(72) Inventors: Kai Müller, Bretzfeld (DE); Maximilian Schiedermeier, Ingolstadt (DE); Martin Breu, Heilsbronn (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/639,996

(22) PCT Filed: Jun. 19, 2018

(86) PCT No.: PCT/EP2018/066241
§ 371 (c)(1),
(2) Date: Feb. 18, 2020

(87) PCT Pub. No.: WO2019/034303
PCT Pub. Date: Feb. 21, 2019

(65) Prior Publication Data
US 2020/0198564 A1    Jun. 25, 2020

(30) Foreign Application Priority Data

Aug. 18, 2017 (DE) ...................... 10 2017 214 442.4

(51) Int. Cl.
*B60R 16/033* (2006.01)
*H02M 3/04* (2006.01)

(52) U.S. Cl.
CPC ............. *B60R 16/033* (2013.01); *H02M 3/04* (2013.01)

(58) Field of Classification Search
CPC ...... B60L 3/0069; H02M 3/04; B60R 16/033; B60R 16/03
See application file for complete search history.

(56) References Cited

U.S. PATENT DOCUMENTS

| 2009/0112384 A1* | 4/2009 | Jeon ..................... H01M 16/003 701/22 |
| 2010/0089672 A1* | 4/2010 | Lee .......................... B60L 58/40 180/65.275 |
| 2013/0002262 A1* | 1/2013 | Tago ...................... G01R 31/52 324/503 |

FOREIGN PATENT DOCUMENTS

| DE | 102 12 493 A1 | 10/2003 |
| DE | 10 2014 103 117 A1 | 9/2014 |

(Continued)

*Primary Examiner* — Jared Fureman
*Assistant Examiner* — Duc M Pham
(74) *Attorney, Agent, or Firm* — Seed IP Law Group LLP

(57) ABSTRACT

An onboard electrical system for a motor vehicle is provided having a primary power supply network and a secondary power supply network electrically connected to the primary power supply network via a DC-DC converter, wherein the primary power supply network and the secondary power supply network are connected to one another via a blocking diode of the DC-DC converter and the blocking diode has a forward direction thereof oriented from the primary power supply network toward the secondary power supply network, and wherein an insulation monitoring device having a measuring resistor is associated with the secondary power supply network for determining an insulation fault. It is provided that an additional resistor is connected in parallel with the blocking diode for bridging thereof, such that an insulation fault common to the primary power supply network and the secondary power supply network can be determined by the insulation monitoring device. A related method for operating an onboard electrical system for a motor vehicle is also provided.

10 Claims, 1 Drawing Sheet

(56) References Cited

FOREIGN PATENT DOCUMENTS

| | | |
|---|---|---|
| DE | 10 2013 018 404 A1 | 5/2015 |
| DE | 10 2014 218 817 A1 | 3/2016 |
| DE | 10 2015 016 000 A1 | 8/2016 |
| DE | 10 2016 006 643 A1 | 2/2017 |
| DE | 10 2016 009 346 A1 | 2/2017 |
| DE | 10 2016 119 015 A1 | 4/2017 |

\* cited by examiner

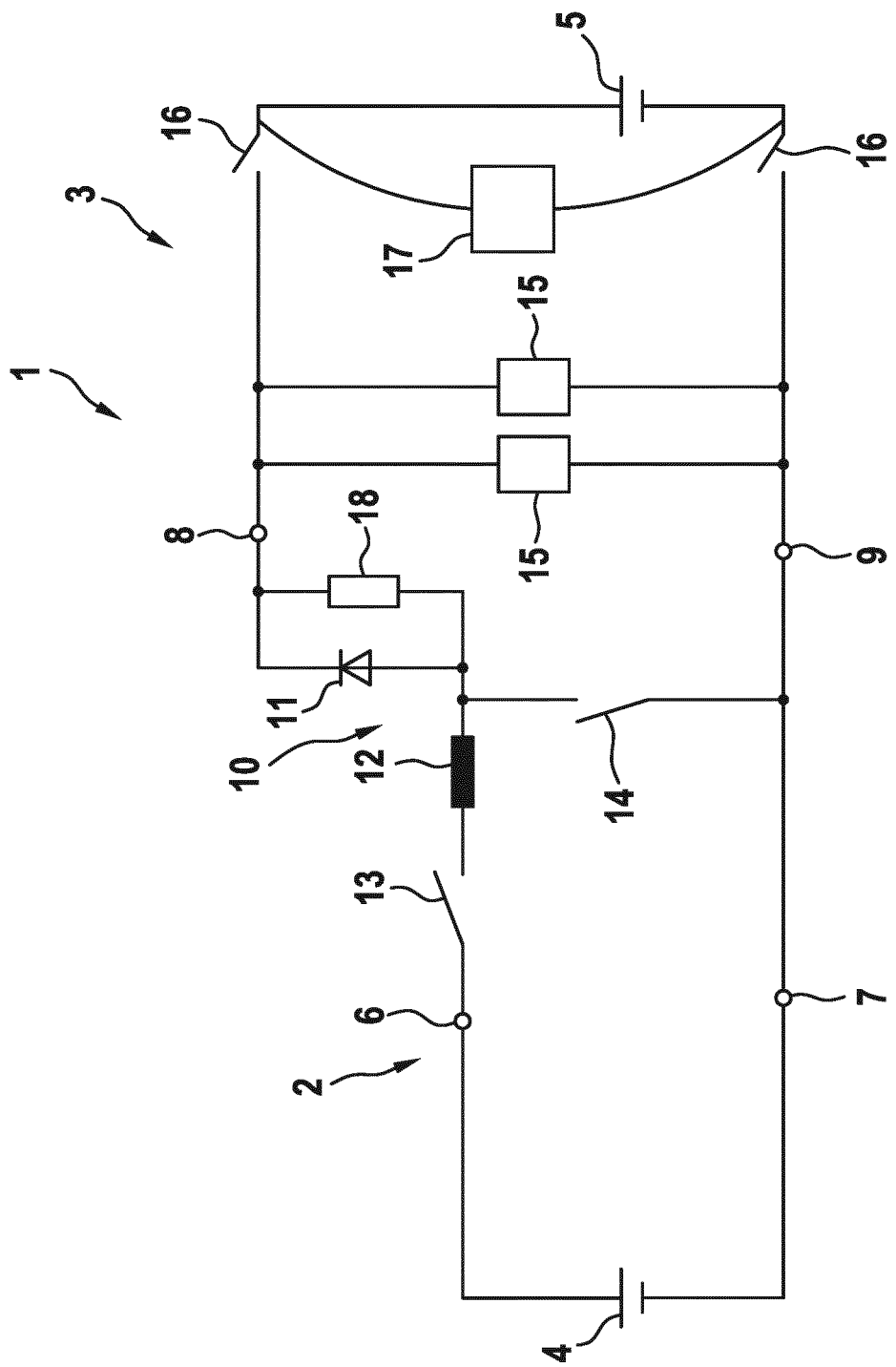

ONBOARD ELECTRICAL SYSTEM FOR A MOTOR VEHICLE AND METHOD FOR OPERATING AN ONBOARD ELECTRICAL SYSTEM FOR A MOTOR VEHICLE

BACKGROUND

Technical Field

The disclosure relates to an onboard electrical system for a motor vehicle having a primary power supply network and a secondary power supply network electrically connected to the primary power supply network via a DC-DC converter, wherein the primary power supply network and the secondary power supply network are connected to one another via a blocking diode of the DC-DC converter and the blocking diode has its forward direction from the primary power supply network toward the secondary power supply network, and wherein an insulation monitoring device having a measuring resistor is associated with the secondary power supply network for determining an insulation fault. The disclosure furthermore relates to a method for operating an onboard electrical system for a motor vehicle.

Description of the Related Art

An onboard electrical system is used to operate at least one electrical load of the motor vehicle. The onboard electrical system has at least one voltage source, but ideally a plurality of voltage sources. For example, each of the power supply networks, that is to say, both the primary power supply network and the secondary power supply network, is associated with a power source. The onboard electrical system is preferably used to operate a drive device of the motor vehicle, which has at least one drive unit configured as an electric machine. The drive unit can be supplied with electrical power via the onboard electrical system.

The drive device and therefore the drive unit is used to drive the motor vehicle, i.e., in this respect to provide a drive torque intended to drive the vehicle. The drive device can of course also be configured as a hybrid drive device, which has at least one additional drive unit in addition to the drive unit. It is particularly preferred for the drive unit and the additional drive unit to be of different types; for example, the additional drive unit may take the form of an internal combustion engine. In the case of a hybrid drive device, it is particularly preferred for the drive unit and the additional drive unit to at least sometimes provide the drive torque jointly.

Document DE 10 2016 009 346 A1, for example, is known from the prior art. It relates to a circuit arrangement for a motor vehicle comprising: a fuel cell stack, a high-voltage battery, an electronic power energy converter through which the fuel cell stack is electrically coupled to the high-voltage battery using a common potential connection, an insulation monitoring device configured to monitor an insulation resistance between the circuit arrangement and a ground potential electrically insulated from it during operation, and a coolant circuit for cooling the fuel cell stack. The coolant circuit is electrically coupled to the common potential connection, wherein the insulation monitoring device is connected between the common potential connection and the ground potential. To improve the measuring accuracy of an insulation resistance in a high-voltage network comprising the circuit arrangement, it is proposed to place the coolant circuit on the common potential connection and to place the insulation monitoring device on the common potential connection.

BRIEF SUMMARY

The task of the invention is to provide an onboard electrical system for a motor vehicle which has advantages over known onboard electrical systems; in particular, it enables the simple and cost-effective testing of the onboard electrical system for the insulation fault by the insulation monitoring device.

This is achieved according to an embodiment of the invention by a system for operating an onboard electrical system for a motor vehicle having a primary power supply network and a secondary power supply network electrically connected to the primary power supply network via a DC-DC converter, wherein the primary power supply network and the secondary power supply network are connected to one another via a blocking diode of the DC-DC converter and the blocking diode has a forward direction thereof oriented from the primary power supply network toward the secondary power supply network, and wherein an insulation monitoring device having a measuring resistor is associated with the secondary power supply network for determining an insulation fault. In this case, it is provided that an additional resistor is connected in parallel with the blocking diode for bridging thereof, such that an insulation fault common to the primary power supply network and the secondary power supply network can be determined by the insulation measuring device.

The primary power supply network and the secondary power supply network are connected to one another via the DC-DC converter. The primary power supply network and the secondary power supply network are preferably at least intermittently operated at different voltage levels, such that a first voltage level is present in the secondary power supply network and a second voltage level different from the first voltage level is present in the secondary power supply network. The DC-DC converter is used for transmitting electrical energy between the primary power supply network and the secondary power supply network and/or vice versa.

The DC-DC converter is preferably designed to solely transmit electrical energy from the primary power supply network into the secondary power supply network, such that no transmission of electrical energy in the opposite direction is provided. It is particularly preferred for a first power source configured, for example, as a fuel cell or the like, to be present in the primary power supply network. By way of the first power source, electrical energy can be provided in the primary power supply network and transmitted to the secondary power supply network via the DC-DC converter.

The DC-DC converter contains the blocking diode via which the primary power supply network and the secondary power supply network are at least intermittently electrically connected to one another. In other words, the primary power supply network is connected to the secondary power supply network via the blocking diode of the DC-DC converter. The DC-DC converter is preferably embodied as a charge pump.

The insulation monitoring device, which is provided for determining the insulation fault, is associated with the secondary power supply network. The insulation monitoring device has the measuring resistor. In order to check for the presence of the insulation fault, the insulation monitoring device connects an electrical pole of the secondary power supply network to a second pole, preferably an electrical ground, via the measuring resistor. In other words, the pole of the secondary power supply network is electrically connected to a body of the motor vehicle via the measuring resistor. The insulation monitoring device supplies a test voltage to the secondary power supply network. If the secondary power supply network is already drawing a current, i.e., if the second voltage is different from zero, the test voltage is superimposed on this second voltage. The insulation monitoring device preferably periodically supplies the secondary power supply network with the test voltage, which may be a square wave voltage.

The magnitude of the current flowing through the measuring resistor is determined while the test voltage is supplied to the secondary power supply network. If the current magnitude deviates from an expected current magnitude or if there is a greater voltage drop at the measuring resistor than expected, the presence of the insulation fault is detected. In this case, the insulation monitoring device in particular initiates suitable countermeasures; for example, an error message is displayed and/or an error entry is written into an error memory.

In the case of the onboard electrical system with the primary power supply network and the secondary power supply network connected to one another via the DC-DC converter, because of the blocking diode, the insulation monitoring device can initially only check the secondary power supply network for the insulation fault. To additionally allow the primary power supply network to be checked for the insulation fault, the additional resistor is connected in parallel with the blocking diode. In other words, the additional resistor electrically bridges the blocking diode, such that the primary power supply network and the secondary power supply network are electrically connected to one another via the additional resistor. With such an embodiment of the onboard electrical system, the insulation monitoring device can then be used to determine the insulation fault common to the primary power supply network and to the secondary power supply network.

In this respect, a separate insulation monitoring device associated with the primary power supply network for determining an insulation fault therein becomes superfluous. Instead, it is sufficient to check for the presence of the insulation fault common to the two power supply networks by way of the insulation monitoring device. This enables a cost-effective embodiment of the onboard electrical system. The additional resistor is preferably of high resistance; for example, it may have a resistance of at least 1 kiloohm, and it is particularly preferred for it to have at least 5 kiloohms, at least 10 kiloohms, at least 50 kiloohms, or at least 100 kiloohms. The functioning of the onboard electrical system is in no way impaired by such a high-resistance additional resistor.

A further embodiment of the invention provides for the primary power supply network to have a first primary power supply network connection and a second primary power supply network connection and for the secondary power supply network to have a first secondary power supply network connection and a second secondary power supply network connection, wherein the first primary power supply network connection and the first secondary power supply network connection are connected to one another via the blocking diode and the additional resistor and the second primary power supply network connection and the second secondary power supply network connection are directly connected to one another. Each of the two power supply networks has in this respect two power supply network connections via which the power supply networks are ultimately electrically connected to one other.

The second primary power supply network connection and the second secondary power supply network connection are directly and preferably permanently electrically connected to one another and in particular are connected to the electrical ground, preferably likewise permanently. The same electrical potential is in this respect provided at the second primary power supply network connection and the second secondary power supply network connection. In contrast, the first primary power supply network connection and the first secondary power supply network connection are connected to one another only indirectly via the blocking diode and the additional resistor, wherein the blocking diode and the additional resistor are placed electrically in parallel between the two terminals. The advantages of such a circuit of the onboard electrical system or of the two power supply networks have already been pointed out above.

In a further development of an embodiment of the invention, a circuit breaker of the DC-DC converter is electrically connected in series with the blocking diode between the first primary power supply network connection and the first secondary power supply network connection. It has already been mentioned above that the DC-DC converter may be configured, for example, as a charge pump. The circuit breaker forms a component of the DC-DC converter or of such a charge pump. The circuit breaker is preferably electrically connected between the first primary power supply network connection, on the one hand, and the blocking diode and the additional resistor, on the other hand. In other words, the circuit breaker is electrically connected to the first secondary power supply network connection via the blocking diode and the additional resistor. This circuit likewise enables a simple design of the onboard electrical system, in particular a cost-effective structure of the DC-DC converter.

In a particularly advantageous further development of an embodiment of the invention, it can be provided for an additional circuit breaker of the DC-DC converter to be electrically connected between the first primary power supply network connection and the blocking diode, on the one hand, and to the second primary power supply network connection, on the other hand. The side of the blocking diode facing away from the first secondary power supply network connection can thus be electrically connected to the second primary power supply network connection via the additional circuit breaker. The additional circuit breaker is likewise preferably a component of the charge pump described above and enables the already mentioned cost-effective design of the DC-DC converter.

A further development of an embodiment of the invention provides for the insulation monitoring device to be a component of a battery connected to the secondary power supply network. In this respect, the battery represents the second power source already mentioned above. It is a component of or at least connected to the secondary power supply network. The battery is preferably designed as a high-voltage battery. The insulation monitoring device is usually already integrated into such a high-voltage battery, in order to be able to test the battery itself for an insulation fault. Accordingly, no further separate insulation monitoring device is necessary, either for checking the secondary power supply network or for checking the primary power supply network. Checking for the insulation fault common to the primary power supply network and the secondary power supply network can therefore be implemented with the least possible hardware complexity.

A further particularly advantageous embodiment of the invention provides for the battery to be connected to the secondary power supply network via at least one contactor.

The contactor allows the battery to be electrically decoupled from the secondary power supply network, in particular with respect to a pole or even a plurality of poles. In particular, the battery has two poles, of which at least one, but preferably both, can be electrically connected to or decoupled from the secondary power supply network as desired by way of the contactor. In other words, the at least one pole or both poles of the battery are electrically connected to the secondary power supply network in a first switching status of the contactor, and are separated from it in a second switching status.

The contactor makes it possible to decouple the battery from both the secondary power supply network and the primary power supply network. If the insulation monitoring device is a component of the battery, the contactor is adjusted to electrically connect the battery to the secondary power supply network in order to check for the presence of the common insulation fault. The provision of the contactor between the battery and the secondary power supply network enables the onboard electrical system or the secondary power supply network to be operated solely with electrical energy from the primary power supply network.

A further particularly advantageous embodiment of the invention provides for at least one load to be electrically connected between the first secondary power supply network connection and the second secondary power supply network. The electrical load may be, for example, the drive unit already mentioned above, in particular the electric machine. The arrangement of the electrical load between the secondary power supply network connections of the secondary power supply network makes it possible to operate the load using solely electrical energy taken from the second power source or the battery. Optionally, the load can also be operated with electrical energy from the primary power supply network, which is provided to the secondary power supply network via the DC-DC converter.

A further particularly advantageous embodiment of the invention provides for a power source in the form of a fuel cell to be present in the primary power supply network. The above-mentioned first power source takes the form of the fuel cell. The electric power provided by the fuel cell can be used for operating the load in the secondary power supply circuit and/or for charging the battery. The fuel cell can ensure a reliable and permanent supply of electrical power to the onboard electrical system.

Finally, in a further embodiment of the invention, it may be provided for an inductor to be connected in series with the blocking diode. Like the blocking diode, the inductor is a component of the DC-DC converter. It is used to temporarily store electrical energy taken up from the primary power supply network at the first voltage. The circuit breaker and/or the additional circuit breaker are adjusted in such a way that the electrical energy temporarily stored in the inductor is supplied to the secondary power supply network at the second voltage. Overall, the above embodiments result in a particularly cost-effective implementation of the DC-DC converter, which also makes it possible to check the onboard electrical system for the insulation fault common to the primary power supply network and the secondary power supply network by way of a single insulation monitoring device.

Another embodiment of the invention relates to a method for operating an onboard electrical system for a motor vehicle, in particular an onboard electrical system according to the above embodiments, wherein the onboard electrical system has a primary power supply network and a secondary power supply network electrically connected to the primary power supply network via a DC-DC converter, wherein the primary power supply network and the secondary power supply network are connected to one another via a blocking diode of the DC-DC converter and the blocking diode has its forward direction from the primary power supply network toward the secondary power supply network, and wherein an insulation monitoring device having a measuring resistor is associated with the secondary power supply network for determining an insulation fault. In this case, it is provided that an additional resistor is connected in parallel with the blocking diode for bridging thereof and an insulation fault common to the primary power supply network and the secondary power supply network is determined by way of the insulation monitoring device.

The advantages of such a design of the onboard electrical system and of such a method have already been described. Both the onboard electrical system and the method for its operation may be developed further in accordance with the explanations above, such that these are referenced in this respect.

BRIEF DESCRIPTION OF THE SEVERAL VIEWS OF THE DRAWINGS

The invention is explained in more detail below with reference to the exemplary embodiments shown in the drawing, without thereby placing any limitations on the invention.

The sole FIGURE shows a schematic illustration of an onboard electrical system for a motor vehicle, having a primary power supply network and a secondary power supply network.

DETAILED DESCRIPTION

The FIGURE shows a schematic representation of an onboard electrical system 1 for a motor vehicle. The onboard electrical system 1 has a primary power supply network 2 and a secondary power supply network 3. In the primary power supply network 2, a first power source 4 is provided, preferably configured as a fuel cell. In contrast, in the secondary power supply network 3, a second power source 5 is provided in the form of a battery. The primary power supply network 2 and the secondary power supply network 3 are at least intermittently electrically connected to one another. The primary power supply network 2 has a first primary power supply network connection 6 and a second primary power supply network connection 7, whereas the secondary power supply network 3 has a first secondary power supply network connection 8 and a second secondary power supply network connection 9.

The two power supply networks 2, 3 are connected to one another via a DC-DC converter 10, which is connected to the first primary power supply network connection 6, the second primary power supply network connection 7, the first secondary power supply network connection 8, and the second secondary power supply network connection 9. The DC-DC converter 10 has a blocking diode 11, an inductor 12, a circuit breaker 13, and an additional circuit breaker 14. The circuit breaker 13 is connected to the first primary power supply network connection 6. The inductor 12 is connected to the circuit breaker 13 on the side of the circuit breaker 13 facing away from the first primary power supply network connection 6.

The blocking diode 11 is in turn connected to the inductor 12 on the side of the inductor 12 facing away from the circuit breaker 13, whereas the blocking diode 11 is connected to the first secondary power supply network connection 8 on the side of the blocking diode 11 facing away from the inductor 12. The circuit breaker 14 is connected between the inductor 12 and the blocking diode 11, on the one hand, and to the second primary power supply network connection 7 and the second secondary power supply network connection 9, on the other hand. The second primary power supply network connection 7 and the second secondary power supply network connection 9 are also directly electrically connected to one another.

In the secondary power supply network 3, at least one load 15, for example, is arranged; in the exemplary embodiment shown here, there are two loads 15. The load 15 is connected to the first secondary power supply network connection 8, on the one hand, and to the second secondary power supply network connection 9, on the other hand, preferably permanently. One of the loads 15 is configured, for example, as power electronics for the drive device, in particular the electric machine. In contrast, another of the loads 15 can be configured as an additional DC-DC converter, by way of which a low-voltage onboard electrical system of the motor vehicle is supplied with electrical power at a voltage which is different from the voltage in the primary power supply network 2 and/or the voltage in the secondary power supply network 3.

The power source 5 is preferably electrically connected to the secondary power supply network 3 or the two secondary power supply network connections 8, 9 via a contactor 16. The power source 5 can thus be electrically decoupled from these by means of the contactor 16. Furthermore, an insulation monitoring device 17 is provided for determining an insulation fault in the onboard electrical system 1. In the exemplary embodiment shown here, the insulation monitoring device 17 is arranged in parallel with the power source 5 in the secondary power supply network 3. In a particularly advantageous alternative embodiment, the insulation monitoring device 17 is integrated into the power source 5; that is to say, it forms a component thereof.

An additional resistor 18 is connected in parallel with the blocking diode 11 so that the insulation monitoring device 17 can determine the insulation fault not only in the secondary power supply network 3. The additional resistor 18 is preferably high-resistance, i.e., has a resistance of at least 1 kiloohm, at least 5 kiloohms, at least 10 kiloohms, at least 50 kiloohms, or at least 100 kiloohms. The resistance value of the additional resistor 18 is preferably taken into account when designing a measuring resistor of the insulation monitoring device 17, not shown here. In particular, the measuring resistor is designed with a resistance value which is reduced by the resistance value of the additional resistor 18.

In order to determine the insulation fault common to the primary power supply network 2 and the secondary power supply network 3, the contactor 16 is activated to electrically connect the power source 5 to the secondary power supply network 3 and consequently to the primary power supply network 2. The insulation monitoring device 17 is subsequently activated in such a way that the onboard electrical system 1 is checked for the presence of the common insulation fault.

The described configuration of the onboard electrical system 1 has the advantage that it is possible to dispense with an additional insulation monitoring device which is used solely to determine an insulation fault in the primary power supply network 2. Instead, a single insulation monitoring device 17 can be used to check for the presence of an insulation fault in the entire onboard electrical system 1, that is to say, in the primary power supply network 2 and in the secondary power supply network 3. Accordingly, less complexity is required to realize the onboard electrical system 1. Some functional complexity can also be dispensed with when testing for the presence of the insulation fault, since otherwise a plurality of insulation monitoring devices in the onboard electrical system 1 cannot test for an insulation fault at the same time to avoid influencing each other.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An onboard electrical system for a motor vehicle having a primary power supply network and a secondary power supply network electrically connected to the primary power supply network via a DC-DC converter wherein the primary power supply network and the secondary power supply network are connected to one another via a blocking diode of the DC-DC converter and the blocking diode has its a forward direction thereof oriented from the primary power supply network toward the secondary power supply network, wherein an insulation monitoring device having a measuring resistor is associated with the secondary power supply network for determining an insulation fault, and wherein an additional resistor is connected in parallel with the blocking diode for the bridging thereof, such that an insulation fault common to the primary power supply network and the secondary power supply network can be determined by the insulation monitoring device.

2. The onboard electrical system according to claim 1, wherein that the primary power supply network has a first primary power supply network connection and a second primary power supply network connection and the secondary power supply network has a first secondary power supply network connection and a second secondary power supply network connection, wherein the first primary power supply network connection and the first secondary power supply network connection are connected via the blocking diode and the additional resistor and the second primary power supply network connection and the second secondary power supply network connection are directly connected to one another.

3. The onboard electrical system according to claim 1, wherein a circuit breaker of the DC-DC converter is electrically connected in series with the blocking diode between the first primary power supply network connection and the first secondary power supply network connection.

4. The onboard electrical system according to claim 1, wherein an additional circuit breaker of the DC-DC converter is electrically connected between the first primary power supply network connection and the blocking diode, on the one hand, and to the second primary power supply network connection, on the other hand.

5. The onboard electrical system according to claim 1, wherein the insulation monitoring device is a component of a battery connected to the secondary power supply network.

6. The onboard electrical system according to claim 5, wherein the battery is connected to the secondary power supply network via at least one contactor.

7. The onboard electrical system according to claim 1, wherein at least one load is electrically connected between the first secondary power supply network connection and the second secondary power supply network connection.

8. The onboard electrical system according to claim 1, wherein a power source in the form of a fuel cell is present in the primary power supply network.

9. The onboard electrical system according to claim 1, wherein an inductor is connected in series with the blocking diode.

10. A method for operating an onboard electrical system for a motor vehicle, wherein the onboard electrical system has a primary power supply network and a secondary power supply network electrically connected to the primary power supply network via a DC-DC converter, wherein the primary power supply network and the secondary power supply network are connected to one another via a blocking diode of the DC-DC converter and the blocking diode has a forward direction thereof oriented from the primary power supply network toward the secondary power supply network, wherein an insulation monitoring device having a measuring resistor is associated with the secondary power supply network for determining an insulation fault, and wherein an additional resistor is connected in parallel with the blocking diode for the bridging thereof, the method comprising:

determining an insulation fault common to the primary power supply network and the secondary power supply network via the insulation monitoring device.

* * * * *